Nov. 12, 1968  P. A. G. LEPELLETIER  3,410,612
DYNAMIC PRESSURE MODULATOR
Filed Nov. 13, 1967  3 Sheets-Sheet 2

INVENTOR
PIERRE A. G. LEPELLETIER
BY Young + Thompson
ATTYS.

INVENTOR
PIERRE A. G. LEPELLETIER
By Young & Thompson
ATTYS nited States Patent Office 3,410,612
Patented Nov. 12, 1968

3,410,612
DYNAMIC PRESSURE MODULATOR
Pierre André Georges Lepelletier, Chatou, France, assignor to Societe Anonyme Francaise du Ferodo, a corporation of France
Filed Nov. 13, 1967, Ser. No. 682,071
Claims priority, application France, Dec. 22, 1966, 88,448
6 Claims. (Cl. 303—22)

ABSTRACT OF THE DISCLOSURE

A dynamic pressure regulator, especially applicable to braking devices for automobile vehicles, and comprising a hollow body in which a first chamber or inlet chamber communicates with a control circuit and a second chamber or outlet chamber with a utilization circuit; in the hollow body slide two pistons adapted to be coupled to each other by hooks. When the pressure in the inlet chamber increases, the corresponding piston is first separately and then conjointly with the other piston, the source of oscillations during which ports are alternately covered and uncoved in turn, the ports forming communications between the outlet chamber either with the inlet chamber or with a return conduit. The pressure in the outlet chamber then develops like the pressure in the inlet chamber but at a smaller rate of variation.

---

The present invention relates to a dynamic pressure modulator and is especially directed to its application to the braking systems of automobile vehicles, in particular in the case where a vehicle of this kind is provided with a hydraulic suspension.

As is well known, it is usual for the braking circuit of an automobile vehicle to comprise a pressure converter interposed between an actuating member and the brakes of one of the axles of the vehicle, most frequently the rear axle. Such a pressure converter has the purpose of ensuring the division of a braking control of the axle considered into at least two separate stages of operation, a first stage of operation during which the pressure applied to the brakes of the said axle, known as the converted pressure, is equal to the driving pressure applied by the actuating member on the pressure converter and on the brakes of the other axle and, beyond a certain value of the driving pressure, a second stage of operation, during which the said converted pressure follows the evolution of the driving pressure, but with a lower rate of variation.

This division of the operation into stages permits the representative curve of the pressure applied to the rear axle as a function of the pressure applied to the front axle to follow most closely the ideal theoretical curve which, as is well known, has a general parabolic form provided that the brakes are such that the braking torque developed by these brakes is substantially proportional to the pressure applied to these brakes.

In most cases, a pressure converter of this kind comprises a hollow body provided with at least two bores and a piston, provided with a rod of different section, the said piston and the said rod sliding in said bores and defining therein an input chamber connected to the actuating member and an outlet chamber connected to the brakes of the axle considered.

In a manner known per se, it is advantageous to control the operation of this pressure converter in dependence on the dynamic load on the rear axle, that is to say on the static load of this axle taking into account the instantaneous variations of this load resulting from the various accelerations to which the vehicle is subjected at a given moment, due for example to braking, to an upward or downward slope of the road, to a bend or the approaches of a bend.

In order to achieve such a control, the effects of which are superimposed on or are added advantageously to the effects resulting from the actual operation of the pressure converter, for the purpose of obtaining a braking curve which most closely follows the ideal theoretical curve, it is usual to connect the hollow body or the piston of the said pressure converter to the chassis of the vehicle, while the piston or the hollow body of this converter is coupled to a non-suspended point of the vehicle; in most cases, this latter connection is effected by elastic means such as spring blades, torsion bars or the like, and it is advantageous to give these elastic means a variable flexibility, the variation of the action on the piston rod of the converter being chosen so as to be greater over the range of low dynamic loads on the rear axle than over the range of high dynamic loads, with a preferably continuous variation.

The present invention has for its object a dynamic pressure modulator which makes it possible to obtain such a connection with variable flexibility, with a very small overall size, which is especially applicable to vehicles provided with a hydraulic suspension.

A dynamic pressure modulator of this kind comprises: a hollow body provided with at least three bores; a first piston having two bearing surfaces separated by an annular groove, namely a first bearing surface of section $S1$ which slides in a first bore of the hollow body opening into a chamber of said body, known as the input chamber, connected to an upstream circuit, and a second bearing surface of section $S'1$, which slides in a second bore of the hollow body opening into another chamber of said body, known as the outlet chamber, connected to a downstream circuit, the said outlet chamber being connected to the said groove by a communication formed in the said first piston, and ports being provided in the hollow body so as to connect the said groove either to the said upstream circuit or with a return circuit, depending on the position of said first piston in the hollow body; a second piston of section $S2$ sliding in a third bore of the hollow body, unidirectional coupling means being provided for connecting the two pistons to each other beyond a predetermined free travel, when they are subjected to opposing forces tending to move them away from each other; and calibrated elastic means associated with each of the said pistons and tending to bring them closer together, the calibration of the elastic means associated with the second piston being greater than that of the elastic means associated with the first piston, and abutment means being provided in the hollow body for each of the pistons.

By virtue of the arrangement of this modulator, the pressure in the outlet chamber, or modulated pressure, which is most frequently the pressure applied to the piston rod of the associated pressure converter, is first zero during a first stage of operation and then develops like the pressure in the input chamber, or input pressure, which is most frequently the pressure existing in the suspension circuit of the vehicle, taking into account a proportionality factor equal to $S1/S'1$ in a first stage of operation during which the first piston is alone the source of alternating or oscillating movements, the said ports being alternately covered and uncovered in turn, and is equal to $$S1-S2/S'1$$

in a third stage of operation during which the two pistons are conjointly the source of oscillations, the said ports being alternately covered and uncovered in turn, as previously.

Due to this method of operation by oscillations, the means position of the pistons remains substantially the same, and the travel of the pistons is thus very small.

According to an alternative form of construction, between the second piston and the corresponding bore of the hollow body is interposed a sleeve of section S3 mounted slidably on the said second piston on the one hand, and on the other hand in the said bore of the hollow body, against the action of calibrated elastic means tending to urge it against a shoulder rigidly fixed to the hollow body, and the calibration of the elastic means associated with the said sleeve is chosen higher than that of the elastic means associated with the second piston.

This arrangement makes it possible to introduce an additional working stage into the operation of the modulator according to the invention.

In addition, in the special case in which the vehicle suspension is of the continuous stream type, the operation of the modulator according to the invention is also preferably of the continuous stream type, that is to say that no sealing joint is interposed between any bore of the hollow body and the member which slides in the said bore.

The characteristic features and advantages of the invention will furthermore be brought out in the description which follows below, reference being made to the accompanying drawings, in which.

Figure 1:
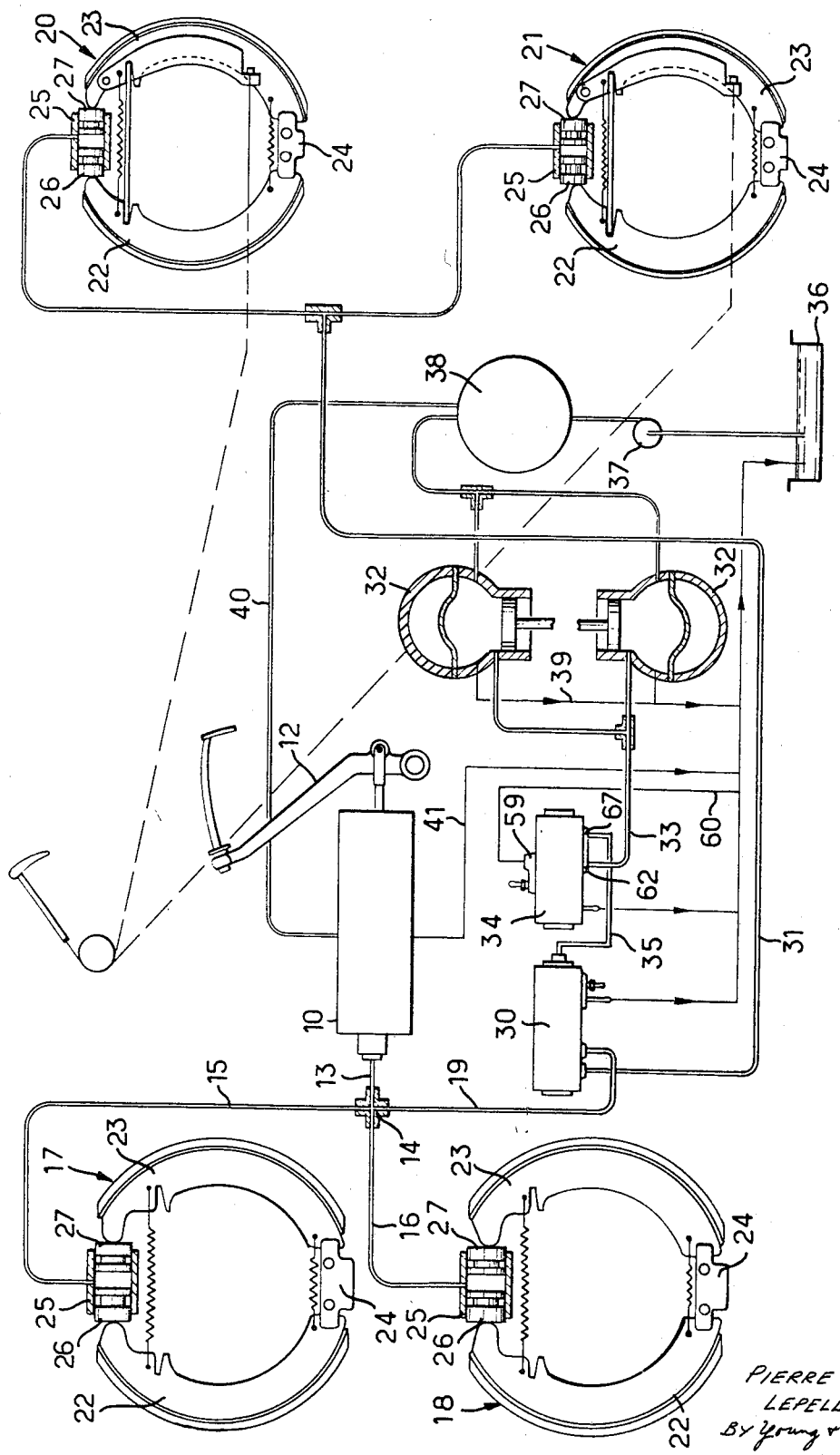
FIG. 1 is the general diagram of a braking circuit comprising a pressure modulator according to the invention and applied to an automobile vehicle provided with a hydraulic suspension, the circuit of said suspension and the braking circuit being of the continuous stream type.

In FIG. 1, there is recognized a continuous flow braking circuit for an automobile vehicle comprising an actuating member 10 operated by a brake pedal 12. This member 10 is adapted to provide a supply of fluid under pressure to a conduit 13 connected at 14 on the one hand to conduits 15 and 16 for the supply of the front brakes 17 and 18, and on the other hand to a conduit 19 for supplying the rear brakes 20 and 21. In the example shown, each of the brakes 17, 18, 20 and 21 is of the usual type with jaws, comprising a compression jaw 22 for forward working and a tension jaw 23, which are supported against a fixed abutment 24 and which are actuated by a hydraulic cylinder 25 with pistons 26 and 27.

The conduit 19 is connected to the cylinders 25 of the rear brakes 20 and 21 through the intermediary successively of a pressure converter 30 and a conduit 31.

There have been shown diagrammatically at 32 in FIG. 1, hydraulic suspension apparatus interposed between the chassis of the vehicle and the rear axle of this latter. The pressure which exists in the interior of these suspension apparatus, known as the input pressure $P_E$ is applied through a conduit 33 to a pressure modulator 34 described in detail below with reference to FIG. 2. The outlet pressure of this pressure modulator 34, known as the modulated pressure $P_M$ is applied through a conduit 35 to the dynamic pressure converter 30.

In accordance with the form of utilization shown, the braking circuit and the hydraulic suspension circuit of the vehicle are both of the continuous flow type.

There have been shown diagrammatically in FIG. 1 the essential elements of such continuous flow circuits, namely, as regards the suspension circuit: a tank 36, a pump 37, a pressure accumulator 38 connected to the hydraulic suspension apparatus 32, and a return pipe 39 connecting these apparatus 32 to the tank 36; and as regards the braking circuit: a pipe 40 connected between the pressure accumulator 38 and the actuating member 10, and a return pipe 41 connecting this latter to the tank 36.

The dynamic pressure converter 30, of a type known per se, will not be described in any further detail below.

Figure 2:
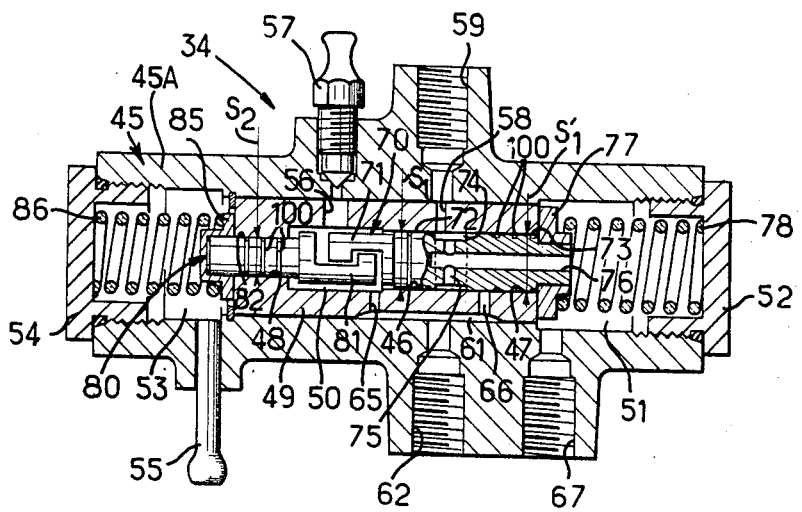
FIG. 2 is a view in axial section of the pressure modulator according to the invention.

Reference will now be made to FIG. 2, which concerns the pressure modulator according to the invention. This modulator 34 is interposed between the hydraulic suspension devices 32 of the vehicle and the dynamic pressure converter 30 for the purpose of establishing a so-called variable-flexibility connection between these elements.

This pressure modulator comprises a hollow body 45 provided with a first bore 46 having a section S1, a second bore 47 with a section S'1, and a third bore 48 having a section S2. For reasons of greater facility, the hollow body 45 is formed by a sleeve 45A and a socket 49 fitted into the sleeve 45A and rigidly fixed thereto.

The socket 49 is provided internally with a chamber 50 or inlet chamber arranged between the bores 46 and 48 of this socket and forms on each side of the hollow body, a chamber 51 closed by a plug 52, known as the outlet chamber, and a chamber 53 closed by a plug 54; this latter chamber communicates with a leakage-collection nozzle 55.

The socket 49 is provided radially with a drilled hole 56 facing a drainage nozzle 57, and with a port 58 facing a nozzle 59 intended to be connected to a tube 60 for returning to the tank 36 (FIG. 1).

The socket 49 is provided externally with a longitudinal groove 61 arranged facing a nozzle 62 and on each side of this latter. The nozzle 62 is intended to be connected to the conduit 33 provided between the pressure modulator 34 and the hydraulic suspension devices 32. At the extremities of the groove 61, the socket 49 is provided on the one hand with a port 65 causing this groove 61 to communicate with the inlet chamber 50, and on the other hand with a port 66, longitudinally displaced with respect to the port 58 arranged vertically above the nozzle 59.

A nozzle 67 of the hollow body 45 communicates with the outlet chamber 51 and permits the coupling of this latter to the dynamic pressure converter 30 by means of the conduit 35 (FIG. 1).

The pressure modulator according to the invention comprises a first piston 70 provided successively with a hooking beak 71 arranged in the inlet chamber 50, a first bearing surface 72 sliding in the bore 46 of the socket 49, and a second bearing surface 73 sliding in the bore 47 of the socket 49. The bearing surfaces 72 and 73 are separated from each other by an annular groove 74, the axial dimension of which is equal to the distance which separates the nearest generator lines of the ports 58 and 66 of the socket 49. This annular groove 74 communicates by radial passages 75 with an axial bore 76 opening into the outlet chamber 51.

In the outlet chamber 51, the piston 70 carries an annular ring 77 and a calibrated spring 78 is interposed between this ring 77 and the plug 52 which closes the outlet chamber 51.

The pressure modulator according to the invention further comprises a second piston 80 provided successively with a hooking beak 81 similar to the hooking beak 71 of the first piston 70 and engaged under this latter in the inlet chamber 50, and a bearing surface 82 sliding in the bore 48 of the socket 49. In the chamber 53, a cap 85 is fitted over the extremity of the piston 80 and a calibrated spring 86 is interposed between this cap 85 and the plug 54 which closes the chamber 53. The calibration R2 of the spring 86 is chosen to be greater than that of R1 of the spring 78.

As will now have been noted, no sealing joint is provided around the pistons 70 and 80, but at the periphery of the bearing surfaces of these latter, annular grooves 100 are formed in known manner.

Figure 3:
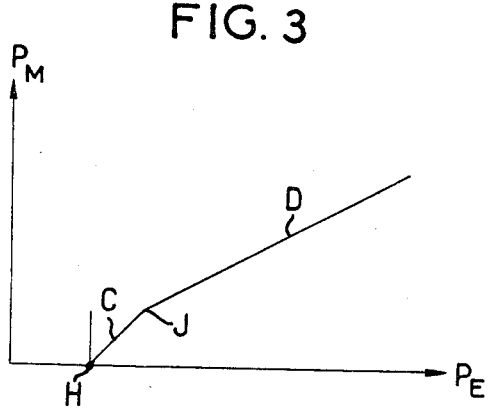
FIG. 3 is a diagram illustrating the operation of this pressure modulator.

The operation of a pressure modulator of this kind will be more clearly understood by making reference to FIG. 3. In this figure, the inlet pressure $P_E$ in the inlet chamber 50, that is to say the pressure applied to the modulator 34 by the hydraulic suspension devices 32 has been plotted in abscissae, while the ordinates represent the modulated pressure $P_M$ which exists in the outlet chamber 51, this modulated pressure being that which is transmitted through the conduit 35 to the dynamic pressure converter 30.

In the position of rest as shown in FIG. 2, the springs 78 and 86 respectively apply the ring 77 and the cap 85 against the corresponding extremities of the socket 49, the hooking beaks 71 and 81 are not in engagement, the port 66 is covered, that is to say closed by the piston 70 and the port 58 is facing the groove 74, and is therefore uncovered. In consequence, the outlet chamber 51 communicates with the nozzle 59 of the return to the tank successively through the axial bore 76, the passages 75, the annular groove 74 and the port 58. The pressure $P_M$ in this chamber 51 is therefore zero.

When the dynamic load on the rear axle increases, the pressure $P_E$ which exists in the hydraulic suspension devices 32 also increases. This pressure $P_E$ or inlet pressure is applied to the inlet chamber 50 successively through the nozzle 62 of the hollow body 45, the groove 61 and the port 65 formed in the socket 49.

For this reason, the first piston 70 is subjected to a force which is applied from left to right and is equal to $P_E.S1$.

The piston 70 is subjected over its section S1 to a force applied from right to left and equal to the calibration R1 of the spring 78.

Beyond a certain value of the pressure $P_E$, the calibration R1 is overcome and the piston 70 moves towards the right of FIG. 2. During the course of this movement, it closes the port 58 and then uncovers the port 66.

The outlet chamber 51 then no longer communicates with the tank 36 but on the contrary with the inlet nozzle 62, successively through the axial bore 76, the radial passages 75, the annular groove 74, the port 66 and the longitudinal groove 61.

The pressure $P_M$ in the outlet chamber 51 then increases. Due to the action of the spring 78 and of this pressure $P_M$, the piston 70 is subjected over its section $S'1$ to a force applied from right to left which urges it in the direction of its initial position, and equal to $R1+S'1.P_M$. When this increasing force becomes greater than $P_E.S1$, the piston 70 begins and continues a return movement until it again entirely closes the port 66 and then uncovers the port 58, thus interrupting the communication between the inlet and outlet chambers.

For this reason, if $P_E$ continues to increase while $P_M$ remains constant, the force $P_E.S1$ will again become preponderant and the piston 70 then recommences its initial movement from left to right and the previous procedure again takes place. The piston 70 is thus the source of alternating to-and-fro movements or oscillating movements, during the course of which the ports 58 and 66 are alternately covered and uncovered in succession.

During the course of this second stage of operation, the representative curve of the modulated pressure $P_M$ as a function of the inlet pressure $P_E$ follows a mean path which a straight line C issuing from a point H on the abscissae axis and the slope of which is equal to $S1/S'1$. In the form of construction shown, the sections S1 and $S'1$ are equal, so that the straight line C has an inclination of 45°, but this may be otherwise. With regard to the abscissae of the point H, this is obviously a function of the calibration R1 of the spring 78.

If, as a result of an increase in the dynamic load on the rear axle, the pressure $P_E$ continues to increase, the force $P_E.S2$ to which the second piston 89 is subjected and which is applied on this piston from the right towards the left of FIG. 3, finally becomes greater than the calibration R2 of the spring 86.

The piston 80 then moves from the right towards the left, and its hooking beak 81 comes into engagement with the hooking beak 71 of the piston 70. The two pistons 70 and 71 are fixed to each other from that moment and are conjointly subjected to an oscillation movement.

During the course of this third stage of operation, the representative curve of the operation is a straight line D starting from a point J of the previous straight line C and having a slope equal to $$S1-S2/S'1$$

that is to say a slope less than that of the straight line C.

The effects of the modulation thus introduced by the apparatus according to the invention between the hydraulic suspension devices and the usual pressure converter 30 are added to or complete advantageously the effects of this pressure converter with the object of obtaining a braking curve which follows as closely as possible the ideal theoretical curve by successive straight-line portions.

Figure 4:
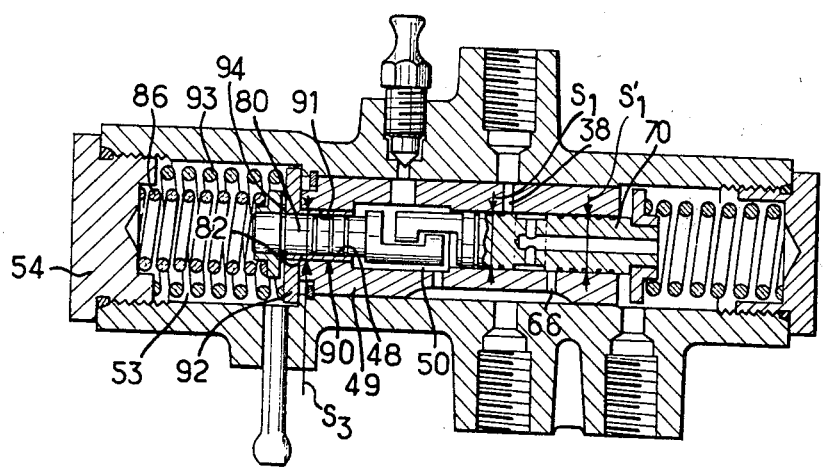
FIGS. 4 and 5 are views respectively similar to those of FIGS. 2 and 3, and relate to an alternative form of construction.

In accordance with the alternative form shown in FIG. 4, the bore 48 in which slides the bearing surface 82 of the second piston 80 is formed in a sleeve 90 slidably mounted in a bore 91 of the socket 49. This sleeve 90 is provided in the chamber 53 with an annular collar 92 and a calibrated spring 93, coaxial with the spring 86, is interposed between the plug 54 which closes the chamber 53 and this collar 92. The calibration R3 of the spring 93 is chosen to be greater than the calibration R2 of the spring 86.

Figure 5:
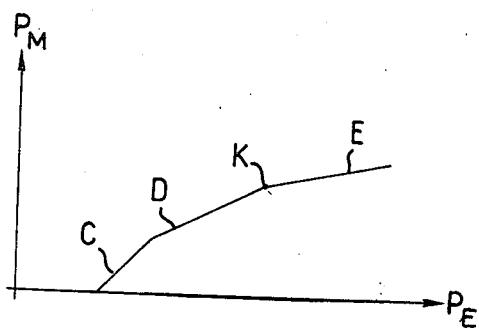

The operation of this alternative form is similar to that previously described and will be better understood by referring to FIG. 5, in which there are again seen the representative straight lines C and D of the second and third phases of operation of the device shown in FIG. 2. In FIG. 4, the piston 70 is shown in its mean position, the ports 58 and 66 being covered. When the inlet pressure $P_E$ exceeds a value for which it balances the calibration of the spring 93, the sleeve 90 is displaced from the right towards the left, carrying with it the piston 80 by means of the circlip 94, so that the inlet pressure $P_E$ in the inlet chamber 50 is applied over a section S3 which is greater than S2.

The representative curve of this fourth stage of operation is therefore a straight line E starting from a point K on the straight line D and having a slope equal to $$S1-S3/S'1$$

What I claim is:

1. A dynamic pressure modulator especially applicable to braking circuits for automobile vehicles, and comprising: a hollow body provided with at least three bores; a first piston having two bearing surfaces separated by an annular groove, namely a first bearing surface of section S1 which slides in a first bore of the hollow body opening into a chamber of said body, or inlet chamber, connected to an upstream circuit, and a second bearing surface of section $S'1$ which slides in a second bore of the hollow body and opens into another chamber of said body, or outlet chamber, connected to a downstream circuit, said outlet chamber being connected to said groove by a communication formed in said first piston and ports being provided in said hollow body for connecting said groove either with said upstream circuit or with a return circuit, depending on the position of said first piston in the hollow body; a second piston of section S2 sliding in a third bore of the hollow body, coupling means being provided for coupling the two pistons to each other beyond a predetermined free travel when they are subjected to opposing forces tending to move them away from each other; and calibrated elastic means associated with each of said pistons and tending to bring them closer together, the calibration of the elastic means associated with the second piston being greater than that of the elastic means associated with the first piston, and abutment means being provided in said hollow body for each of said pistons.

2. A pressure modulator as claimed in claim 1, in which said coupling means provided between the two pistons comprise, for each piston, a hooking beak formed at the extremity of the piston and engaged with the corresponding similar hooking beak of the other piston.

3. A pressure modulator as claimed in claim 1, in which, between the second piston and the corresponding bore of the hollow body, is interposed a sleeve of section S3 slidably mounted on the one hand on said second piston and on the other in said bore of the hollow body, against the force of calibrated elastic means tending to urge it against a shoulder fixed to said hollow body.

4. A pressure modulator as claimed in claim 3, in which the calibration of the elastic means associated with said sleeve is greater than that of the elastic means associated with said second piston.

5. A pressure modulator as claimed in claim 1, in which said hollow body is formed by a sleeve and a socket fitted into said sleeve.

6. A pressure modulator as claimed in claim 1, in which the operation of said modulator is by continuous flow, that is to say that no sealing joint is interposed between any bore of the hollow body and the device which slides in said body.

References Cited

UNITED STATES PATENTS 3,306,678  2/1967  Lepelletier _____ 303—22

MILTON BUCHLER, *Primary Examiner.*

JOHN J. McLAUGHLIN, *Assistant Examiner.*